(12) United States Patent
Shuster

(10) Patent No.: US 8,443,106 B2
(45) Date of Patent: May 14, 2013

(54) CONTENT RESTRICTION COMPLIANCE USING REVERSE DNS LOOKUP

(76) Inventor: Gary Stephen Shuster, Fresno, CA (US)

( * ) Notice: Subject to any disclaimer, the term of this patent is extended or adjusted under 35 U.S.C. 154(b) by 564 days.

(21) Appl. No.: 12/339,763

(22) Filed: Dec. 19, 2008

(65) Prior Publication Data

US 2009/0164597 A1 Jun. 25, 2009

Related U.S. Application Data

(60) Provisional application No. 61/016,440, filed on Dec. 21, 2007.

(51) Int. Cl.
 *G06F 15/16* (2006.01)
 *G06F 15/173* (2006.01)

(52) U.S. Cl.
 USPC .......................... 709/245; 709/203; 709/225

(58) Field of Classification Search .................. 709/203, 709/245, 201–202, 204–217, 223–225
 See application file for complete search history.

(56) References Cited

U.S. PATENT DOCUMENTS

| | | | |
|---|---|---|---|
| 5,918,014 A * | 6/1999 | Robinson | 709/219 |
| 6,065,055 A | 5/2000 | Hughes et al. | |
| 6,233,618 B1 | 5/2001 | Shannon | |
| 6,928,455 B2 | 8/2005 | Dougu et al. | |
| 7,260,598 B1 | 8/2007 | Liskov et al. | |
| 7,424,439 B1 * | 9/2008 | Fayyad et al. | 705/7.33 |
| 2002/0065920 A1 * | 5/2002 | Siegel et al. | 709/227 |
| 2002/0087726 A1 * | 7/2002 | Macpherson et al. | 709/245 |
| 2003/0028532 A1 | 2/2003 | Dougu et al. | |
| 2003/0182420 A1 | 9/2003 | Jones et al. | |
| 2005/0038702 A1 * | 2/2005 | Merriman et al. | 705/14 |
| 2005/0050222 A1 | 3/2005 | Packer | |
| 2005/0102407 A1 | 5/2005 | Clapper | |
| 2005/0114794 A1 | 5/2005 | Grimes et al. | |
| 2005/0177844 A1 * | 8/2005 | Levi et al. | 725/30 |
| 2006/0173793 A1 * | 8/2006 | Glass | 705/75 |
| 2006/0218575 A1 | 9/2006 | Blair | |
| 2006/0224689 A1 * | 10/2006 | Leip et al. | 709/217 |
| 2006/0248190 A1 * | 11/2006 | Gardos et al. | 709/225 |
| 2006/0259778 A1 * | 11/2006 | Gudorf et al. | 713/186 |
| 2007/0204040 A1 | 8/2007 | Cox | |
| 2007/0260603 A1 * | 11/2007 | Tuscano et al. | 707/9 |
| 2008/0059310 A1 * | 3/2008 | Lettow et al. | 705/14 |
| 2008/0114862 A1 * | 5/2008 | Moghaddam et al. | 709/220 |
| 2008/0288774 A1 * | 11/2008 | Mahdavi | 713/155 |

OTHER PUBLICATIONS

The American Heritage Dictionary of the English Language, definition of demographics, 2000.*

(Continued)

*Primary Examiner* — Joshua Joo
(74) *Attorney, Agent, or Firm* — Novak Druce Connolly Bove + Quigg LLP; Jonathan Jaech

(57) ABSTRACT

A method for alerting Internet content providers of the age or other personal information of a computer user, which includes receiving a reverse DNS lookup query from an Internet content provider; and providing the age information of the computer user, in addition to a host name, from a reverse map zone file in response to the request. The personal information may be used by the content provider to select appropriate content for the requesting host, for example for complying with content restrictions. A system of alerting an Internet content provider of the age or other personal information of a computer user is also provided.

18 Claims, 2 Drawing Sheets

OTHER PUBLICATIONS

Dicionary.com, definition of demographics, retrieved Feb. 14, 2007.*
Liu, et al. European Patent Application, Publication No. EP 1 662 232, "Method and Apparatus for Regulating Network Access", Feb. 1, 2006, Zyxel Communications Corporation.

* cited by examiner

| Name | ttl | Class | rr | text |
|------|-----|-------|-----|------|
| John |     | IN    | TXT | "04US*1951*1998" |

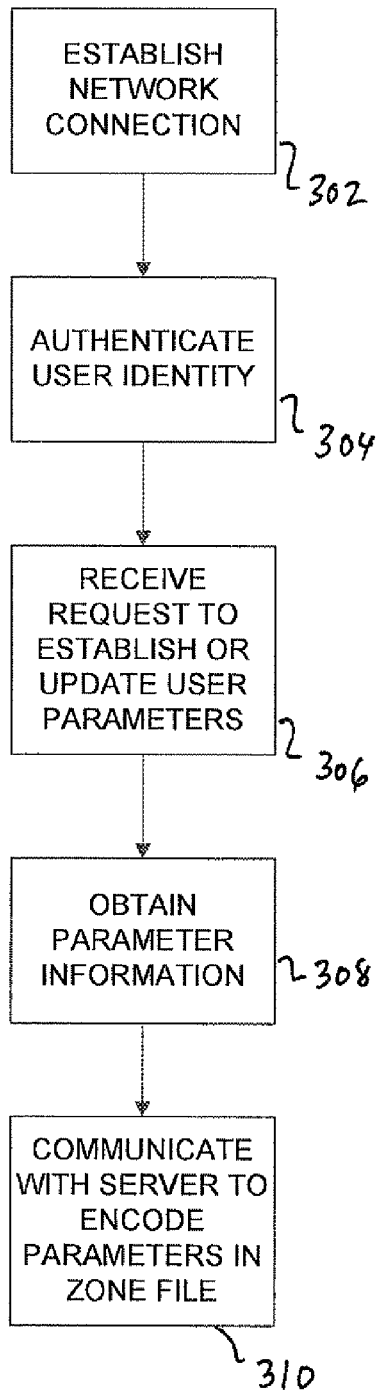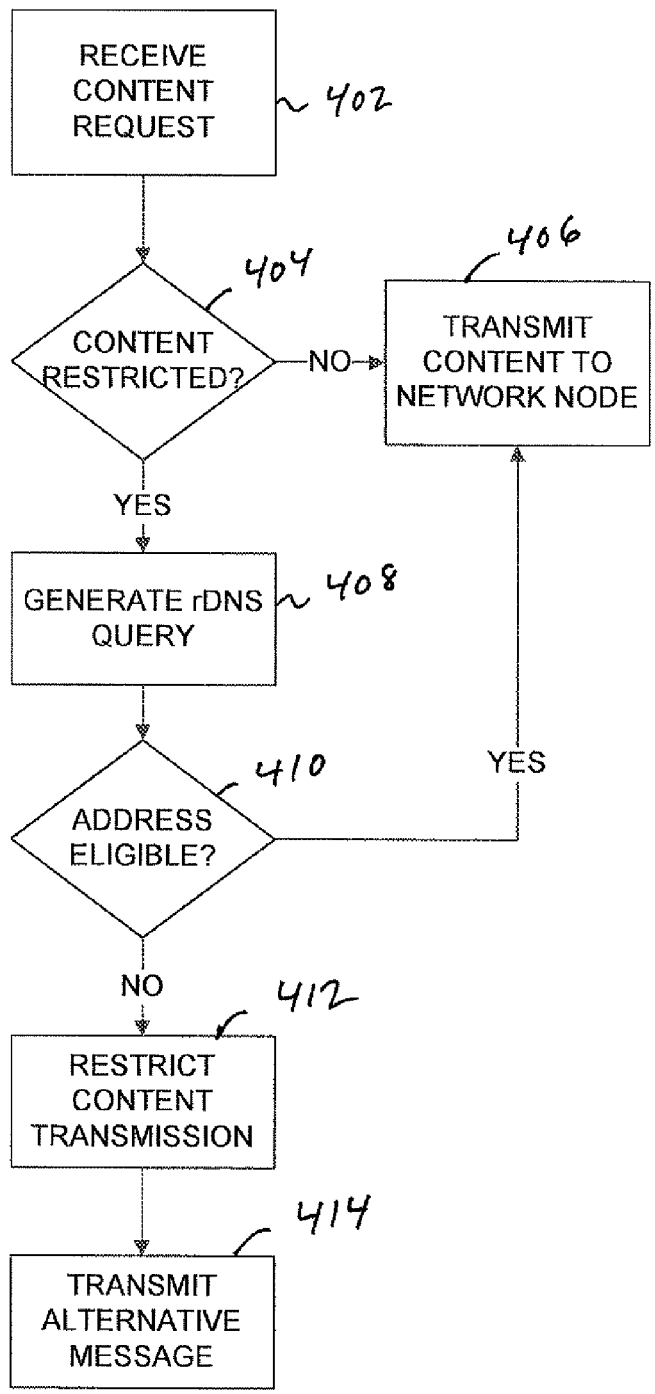

CONTENT RESTRICTION COMPLIANCE USING REVERSE DNS LOOKUP

CROSS-REFERENCE TO RELATED APPLICATION

This application claims priority pursuant to 35 U.S.C. §119 (e) to U.S. provisional application Ser. No. 61/016,440, filed Dec. 21, 2007, which is hereby incorporated by reference in its entirety.

BACKGROUND

1. Field

The invention relates to methods and systems for complying with content restrictions for computer-accessed content, such as restrictions tied to user age, location, preferences or other attributes associated with particular network addresses.

2. Description of Related Art

Various age verification and filtering applications are used for protecting children from receiving age-inappropriate materials over the Internet. Client-side applications are also used to prevent users from using particular clients to access restricted or inappropriate content.

One type of age verification method simply requires all users of a particular website to verify their age, such as by providing a credit card account number which is then cross-checked for validity. Only users that provide a valid credit card number are then allowed to access adult content on the website. Notwithstanding the advantages of such methods, they are subject to certain limitations. For example, the age verification only operates in connection with the website that obtains the credit card information, or its affiliate sites. Therefore a user may be inconvenienced by having to provide the credit card information multiple times to access information from multiple sites. Also, many users are not willing to provide credit card information, and thus, sites that employ this method may not attract a user base as large as might otherwise be possible. In practice, credit card checks and similar methods are therefore used mainly for subscription-based sites that offer adult content to subscribers only. Unintentional access by children or other users to restricted content is prevented by using registered accounts associated with credit cards, and requiring users to supply passwords before accessing content.

However, the problem of age-inappropriate content, or region-inappropriate content, is not limited to subscription-only sites. The most popular Internet sites are generally not subscription sites. At the same time, many popular non-subscription sites may include a great diversity of content, which may include age-restricted or region-restricted content along with a great deal of unrestricted content. Indeed, many popular sites derive much of their content from user-supplied material, and thus, site operators or other content providers may sometimes be unaware that posted content is subject to age or region restrictions. The presence of such content may permit children or others to inadvertently access restricted content, despite the best efforts of the site operator to prevent such occurrences. Such inadvertent access is generally undesirable, and may subject the site operator to legal liability.

Various client-side filtering applications are known to prevent clients from inadvertently accessing restricted materials. These methods use client-side software, sometimes called "censorware," to detect materials that are known or suspected to be restricted on the particular machine. While censorware can be effective when properly installed and operating, it can do nothing to prevent inadvertent access to restricted material from machines on which it is not installed or operating. In addition, censorware is controlled on the client side, and therefore content providers may not be able to determine whether or not the censorware is installed and operating properly.

Therefore, it would be desirable to provide a method or system for preventing inadvertent access to restricted content, that overcomes these and other limitations of the prior art.

SUMMARY OF THE DISCLOSED EMBODIMENTS

Accordingly, the following aspects provide for a method and system to enable content providers to comply with selectively-applied content restrictions, such as restrictions arising from the age or location of a computer user. In some embodiments, an Internet Service Provider (ISP) collects parameters relevant to content restrictions, such as the age or birth year of prospective Internet users in the household to which service is being provided, or is to be provided. In setting up or maintaining subscriber accounts, the ISP encodes the user parameters in a zone file of a Domain Name System (DNS). For example, the user parameters may be encoded as text characters in a text field of a pointer (PTR) record associated with the account holder. User parameters in the zone file may be updated by the user via the ISP to reflect changes in user parameters, such as when a new computer user is added to a household. In general, an administrator or account holder for each client may be responsible for supplying and maintaining the user parameter information. In other words, it is the end user (such as, for example, the parent or parents in a household) that may be responsible for specifying the user parameters to be used in content selection for content restriction compliance.

Once an ISP or other service provider has configured the zone file associated with an Internet Protocol (IP) address of the client, content providers may access the zone file to determine user parameters associated with each content request. Using the originating IP address for each content request, the content provider may generate a reverse DNS lookup query. However, the purpose of the reverse query need not include determining or verifying a host domain name associated with the user's IP address, which is the traditional function of a reverse DNS lookup query. Instead, the reverse lookup is performed to obtain the user parameters that are encoded in the text or other field of the PTR record associated with the IP address.

In one aspect, the method comprises:

receiving a reverse DNS lookup query from an Internet content provider; and providing the age information of the computer user, in addition to a host name, from a reverse map zone file in response to the request.

In another aspect, the system comprises:

at least one DNS server, a DNS resolver, a reverse map zone file, wherein the zone file comprises the age information of a computer user, and wherein Internet content is distributed to a computer user based on the age information recited in the zone file after a reverse DNS lookup queried by an Internet content provider.

In particular, the age information of the computer user or users may be obtained via a reverse Domain Name System (rDNS) lookup query from the content provider or ISP. Relevant user parameters such as birth date or year, user age or age status of the user as a minor/underage may be placed in a resource record of a zone file by the ISP. This placement puts the burden of age verification on the content provider or ISP. In particular, before any Internet content, i.e., a webpage, is sent to a requesting IP address, the age information of the user may be communicated to an Internet content provider when an rDNS lookup is performed, and then only age appropriate Internet content is sent to the user.

In addition, the zone file may be used to encode the relevant user parameters for multiple users. Thus, for example, the birth year or minor/adult status may be recorded in the zone file for all persons residing in a particular household served by a certain ISP. When that ISP or other content provider receives a content request from an unidentified user of the household, the recipient of the content request may apply the most restrictive rule, such as assuming that the request was made by the youngest household member. Conversely, when the content request comes from an authenticated known user, the restrictions applicable to that user may be applied, and there may be no need for an rDNS query by the content provider.

A more complete understanding of the broadband video with synchronized highlight signals will be afforded to those skilled in the art, as well as a realization of additional advantages and objects thereof by a consideration of the following detailed description of the preferred embodiment. Reference will be made to the appended sheets of drawings which will first be described briefly.

BRIEF DESCRIPTION OF THE DRAWINGS

FIG. 3 is a flow diagram illustrating an embodiment of a method of content restriction compliance using reverse-DNS lookup.

FIG. 4 is a flow diagram illustrating an embodiment of a method for configuring a zone file for content-restriction compliance using reverse-DNS lookup.

In the detailed description that follows, like element numerals are used to describe like elements appearing in one or more of the figures.

DETAILED DESCRIPTION OF THE DISCLOSED EMBODIMENTS

Figures 1, 2:
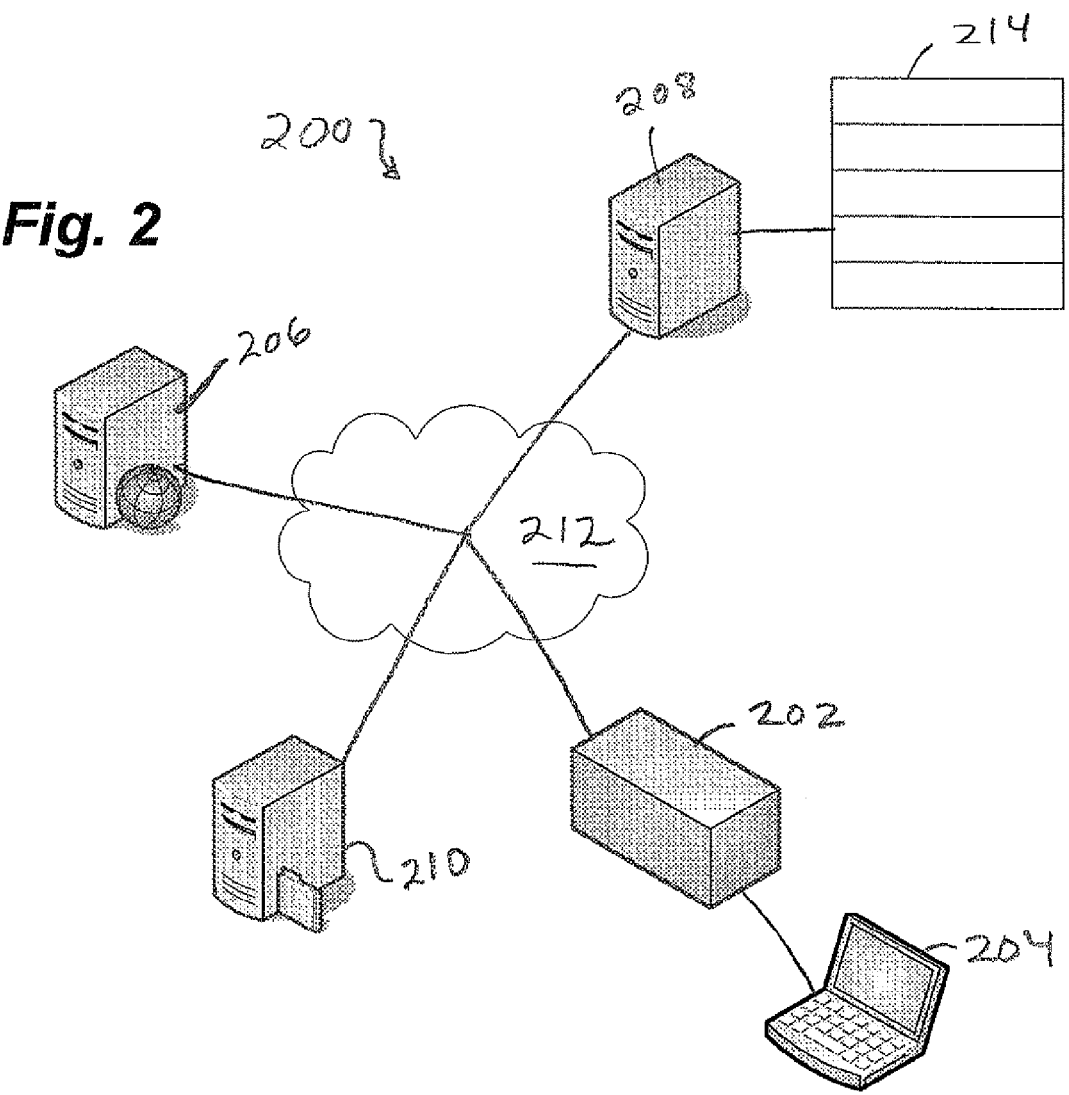
FIG. 1 is a table showing an exemplary resource record for use in of content restriction compliance using reverse-DNS lookup.
FIG. 2 is a block diagram illustrating an embodiment of a system for content restriction compliance using reverse-DNS lookup.

A more complete appreciation of the disclosure and many of the attendant advantages will be readily obtained, as the same becomes better understood by reference to the following detailed description. The Request for Comments (RFCs), as recited throughout the disclosure, should be understood to mean a series of published memoranda/proposals encompassing new research, innovations, and methodologies applicable to Internet technologies, which have been adopted by the Internet Engineering Task Force (IETF) as Internet standards.

A reverse DNS (rDNS) lookup, which also may be referred to as a reverse lookup, reverse mapping, reverse resolving, or inverse DNS, determines the host name or host associated with a given IP address or host address. As known in the art, a receiving server performs an rDNS lookup on the IP address of the incoming connection of a computer user, and determines whether there is a valid domain name associated with it. The present technology uses reverse DNS lookup in a new and unexpected way to achieve unexpected results.

A host name is generally understood to mean a name by which a network attached device, e.g., a computer, files server, network storage device, fax machine, copier, cable modem, etc., is known on a network. On the Internet, a host name may comprise a domain name assigned to the host. Domain naming is defined in RFC 1034 and RFC 1035. In particular, a hostname is a series of alphanumeric strings separated by periods, such as www.mycomputer.com, that is an address of a computer network connection and that identifies the owner of the address. The hostname may also be an e-mail address, such johndoe@mycomputer.com. The part before the @ sign is the local part of the address, often the username of the recipient, and the part after the @ sign is the domain part.

An IP address (Internet Protocol address) is generally understood to mean a device's numeric address, such as 123.4.5.67, used to identify and communicate on a computer network utilizing the Internet Protocol standard (IP). Any participating network device, including, but not limited to, routers, computers, time-servers, printers, Internet fax machines, and some telephones, can have their own specific address.

A zone file is a database element of the DNS, which generally contains information that defines the mappings between domain names and IP addresses and reverse mappings that resolve IP addresses into domain names. A rDNS identifier is contained in a resource record, i.e., a pointer (PTR) record, of a zone file. Generally, resource records, including the format of the zone file, may be configured as defined in RFC 1035. Zone files are also referred to as master files that contain directives, comments, and resource records, which describe the characteristics of a zone and individual hosts and services within a zone.

A reverse lookup is generally accomplished using a "reverse in-addr entry" in the form of a PTR record in the zone file. In particular, rDNS lookups for IPv4 addresses use a reverse in-addr entry in the special domain in-addr.arpa. An IPv4 address is represented in the in-addr.arpa domain by a sequence of bytes in reverse order, represented as decimal numbers, separated by dots with the suffix .in-addr.arpa. For example, the reverse lookup domain name corresponding to the IPv4 address 123.4.5.67 is 67.5.4.123.in-addr.arpa.

Reverse DNS lookups for IPv6 addresses use the domain ip6.arpa, which is represented as a name in the ip6.arpa domain by a sequence of nibbles in reverse order, represented as hexadecimal digits, separated by dots with the suffix. ip6.arpa. "IP6" refers to the feature only as it applies to IPv6 use, and "ip6.arpa" to the portion of the dns that provides the ipv6-specific functionality.

It should be understood that records, other than PTR records, may be placed in a rDNS tree or reverse map zone file. For instance, encryption keys, text (TXT) records, and location (LOC) records, which identify the location of the IP address, may be inserted. TXT records generally have no specific definition, since any information can be recited in them. For instance, some TXT records are used for a generic description of the host, primary user, or even a phone number. In an embodiment of the Internet age alert method and system of the disclosure, the age of the computer user can be recited in a text record.

The format of the TXT record may be as shown in FIG. 1, showing an exemplary text record and related information in a record 100 of a reverse map zone file or rDNS tree. "Name" 102 is the name of the node in the zone file to which this record belongs. The labe "ttl" 104 is a 32 bit value, which is the Time To Live in seconds (range is 1 to x). The value zero indicates the data should not be cached, "Class" 106 is a 16 bit value which defines the protocol family or an instance of the protocol. The label "rr" 108 is the indicator of the resource record. The label "text" 110 is any recited text for the record.

DNS generally consists of a hierarchical set of DNS servers in a tree or hierarchical structure. Each domain or subdomain has one or more authoritative DNS servers that publish information about that domain and the name servers of any domains beneath it. The hierarchy of authoritative DNS servers matches the hierarchy of domains. At the top of the hierarchy stand the root servers, which are the servers to query when looking up (resolving) a generic top level domains (gTLDs), such as .com, .org, and .net, and the country codes, such as .ca, .uk and .jp.

The ISP to which a computer/machine connects will usually supply a DNS server, in which a user will either have configured that server's address manually or allowed DHCP to set it. DHCP is understood to mean a protocol used by networked computers to obtain IP addresses and other parameters. However, where systems administrators have configured systems to use their own DNS servers, their DNS resolvers point to separately maintained nameservers of the organization.

Generally, a rDNS lookup for an IPv4 address may be accomplished by the following exemplified steps:

1. The DNS resolver, a communication mechanism in an operating system, reverses the IP address, and adds it to ".in-addr.arpa" (or ".ip6.arpa"), turning 123.4.5.67 into 67.5.4.123.in-addr.arpa.

2. The DNS resolver then looks up the PTR record for 67.5.4.123.in-addr.arpa.

3. The DNS resolver requests the root servers for the PTR record for 67.5.4.123.in-addr.arpa.

4. The root servers refer the DNS resolver to the DNS servers in charge of the Class A range (123.in-addr.arpa, which covers all IPs that begin with 123).

5. The root servers refer the DNS resolver to a "RIR" ("Regional Internet Registry"). The organizations that allocate IPs include ARIN (American Registry for Internet Numbers), which handles North American IPs, APNIC (Asian Pacific Network Information Centter), which handles Asian-Pacific IPs, and RIPE (Réseaux IP Européens), which handles European IPs.

6. The DNS resolver asks the ARIN DNS servers for the PTR record for 67.5.4.123.in-addr.arpa.

7. The ARIN DNS servers refer the DNS resolver to the DNS servers of the organization that was originally given the IP range. These are usually the DNS servers of the ISP, or their bandwidth provider.

8. The DNS resolver asks the ISP's DNS servers for the PTR record for 67.5.4.123.in-addr.arpa.

9. The ISP's DNS servers refer the DNS resolver to the organization's DNS servers.

10. The DNS resolver asks the organization's DNS servers for the PTR record for 67.5.4.123.in-addr.arpa.

11. The organization's DNS servers respond with "host.mycomputer.com".

In the Internet age alert method of the disclosure, the age information of the computer user is recited in the reserve map zone file, which is also the location of the PTR record discussed above, such that the ISP's DNS servers can automatically provide a resource record from the zone file that contains the age information of a computer user. From the provided age information in the zone file, an Internet content provider can deny, restrict, or limit online content, interactions, and information exchanged by computer users.

In particular, the age information is provided in a resource record of the zone file, such as a text record, as mentioned above. The age information may include, but is not limited to, a numerical age of the computer user, the birth date of the computer user, or an indicator that the computer user is under the age of majority. The text record may also contain demographic information, other than or in addition to the age information, of the computer user. The age information or other demographic information is specifically provided in the zone file by the Internet service provider of the computer user, and may be updated or modified by the Internet service provider. Any updates or modifications to the age information may be stored on at least one of the Internet service provider's DNS servers, so that Internet content providers can be alerted of such updates or modifications or query reverse DNS entries that contain such updates or modifications.

In the Internet age alert system of the disclosure, the system includes, but is not limited to the above-mentioned traditional parameters for a rDNS lookup, but should include at least one DNS server, a DNS resolver, a reverse map zone file, wherein the zone file comprises the age information of a computer user, and wherein Internet content is distributed to a computer user based on the age information recited in the zone file after a reverse DNS lookup queried by an Internet content provider.

It should be understood that in both the method and system of the disclosure, the age information is initially provided by the purchaser of Internet access from the ISP. Thereafter, the ISP may update or modify the zone files with a request from the purchaser or automatically on every DNS server.

In view of the foregoing, it should be apparent that the described methods may be implemented using various different computer systems. FIG. 2 shows an exemplary system 200 for content restriction compliance using a reverse DNS lookup by a content provider or ISP. System 200 may comprise an ISP server 202 providing Internet service to clients 204 (one of many shown), a content management server 206, a DNS server 208, and a file server 210, connected via a wide area network 212. Each of the servers 202, 206, 208, 210 and the client 204 may comprise a processor, computer memory, and network interface, as known in the art. The ISP server 202 and/or content provider server 206 may be programmed to perform the novel method described herein, enabling controlled access to electronic content for a person operating client 204, such as using software encoded on a computer-readable medium. In addition, each of the various servers may access stored data. In particular, the DNS server 208 may access a zone file 214 as described above, comprising a plurality of resource records. System 200 may further comprise a DHCP or other server (not shown) maintaining a zone file with dynamic IP addresses for different client domains.

An operator of client 204 may provide input to the system via a computer interface device, for example, a keyboard, pointing device, microphone, or some combination of the foregoing. The input may include parameter information relevant to determining whether or not a content restriction applies to client 204 or any other client connected to ISP server 202 on the same account as client 204. The input may further include a request for content, for example a request made by selecting a link on a Web page displayed by client 204. Other inputs to system 200 may include content provided via content manager 206, which optionally may be stored on a separate file server 210, and various administrative inputs required to configure ISP 202, or other server, to operate in the described manner. System outputs may include requested content or an "access denied" message, which may be displayed on client 204. It should therefore be apparent that system 200, when used to perform the methods described herein, operates to transform input received at client 204 into a tangible output, depending on the state of a resource record 214 in the zone file 214. In turn, the state of the resource record may be made responsive to inputs received via client 204, as when the ISP server 202 and DNS server 208 establish and maintains user parameters encoded in the resource record, in response to input from an authenticated account holder for the client 204.

Also in accordance with the foregoing, an ISP server may be used to implement a method 300 for configuring and maintaining a resource record, as shown in FIG. 3. Executable elements of method 300 may be programmed using any suitable programming technique, to provide instructions for operating the ISP server. The instructions may be encoded in a computer-readable medium for storage and use by the ISP server, causing it to perform the described method. Method 300 operates to transform user input collected by the ISP from an administrator of a client account into user parameter data that is publicly available via a zone file of a DNS system, or equivalent DHCP file or other address table responsive to an IPv4 or IPv6 reverse DNS query. Such records may be maintained in a computer-readable medium or computer memory as known in the art.

In preparation for communication between the ISP server 202 and client 204, a connection is first established 302 between these nodes, for example via a network router. A router, as known in the art, may provide a connection node for one or more client connecting to the ISP server within a particular personal domain or account. When an account is first established for a person or household, and at various times after an account is established, the ISP server may authenticate 304 the identity of a person connecting via a known connection device, such as a router. For example, when a person purchases Internet access via a particular ISP, the ISP may provide the person with an identified router having a defined unique identification code, and associate that code with the person's name and address in its account records. Therefore when a connection is made to an ISP server using the identified router, the ISP server identifies the connection as belonging to the person associated with the router ID code. In the alternative, or in addition, the ISP may provide each person with unique log-in name and password. At various times after an initial set up, the ISP may re-authenticate the identity of the person connecting via the router or other device, for example, when the ISP or designated administrator for the client account desires to change an account setting.

At 306, the ISP server may receive a request to establish or update user parameters used for enforcing content restrictions, to be placed in a DNS zone file for the account's domain. Use of the techniques disclosed herein for content restriction may be made optional for the end user, enabling users to set up and operate unrestricted accounts. In the alternative, the ISP may require the designated administrator for the account to supply relevant user parameters, for example, the birth year of every person in the household with access to the household's computer terminal or terminals. In addition, the ISP server may accept updated user parameter information from the account administrator, at any desired time.

At 308, the ISP server may obtain the relevant user parameter information from the client, such as by serving an XML form to the client and receiving responses submitted from the client via the form. Other information may be obtained without requiring the account administrator to provide it. For example, it may be possible for the ISP to determine what geographic region or country a router is located in without requiring user input, by analyzing the connection or by using a locating device on the router. However, in general the account administrator should be a responsible adult with an interest in protecting under age person from inappropriate content. Therefore, it should usually be appropriate and practical to obtain age information from the account administrator, or other parameter information, at the time of account set-up and at other times, via a network connection between the ISP server and account client.

At 310, the ISP server may communicate with a DNS or DHCP server for the client domain to establish or update a record in a zone file with encoded user parameter information collected from the client or otherwise obtained. The record may comprise information as shown, for example, in FIG. 1. The zone file may be formatted according to IPv4 or IPv6. The zone file record may further comprise a numeric IP address. The numeric IP address may be a static IP address for the client domain. In the alternative, if the IP address for the client domain is assigned dynamically, the record may be contained in a zone file of a DHCP server, and may change from time to time. Wherever the record and zone file are maintained, they are configured to provide certain essential features: (1) the record maintains a current IP address for the client domain and user parameter information associated therewith, and (2) the record is publicly accessible via a reverse DNS lookup query, either directly or via a DHCP or other server operated by the ISP. The ISP may update the zone file whenever the client IP address or user parameter information changes. The ISP may delete the record if ever the client account is terminated.

With the client address and user parameter information established and maintained in the publicly-accessible record via a reverse-DNS lookup query, content providers, including but not limited to the ISP, may make use of the rDNS query to implement a content restriction method 400, and shown in FIG. 4. Executable elements of method 400 may be programmed using any suitable programming technique, to provide instructions for operating the content provider server. The instructions may be encoded in a computer-readable medium for storage and use by the content provider server, causing it to perform the described method. Method 400 operates to transform user input originating the content request into an output conditioned on eligibility information recorded in the DNS zone file, while eliminating any need for personal authentication passed on private information. By definition, information in the zone file is publicly available via the computer network, and should not be considered private.

At 402, a content provider server may receive a content request via a computer network. The content address comprises a network address ("destination address") to which content is to be transmitted via the computer network. For example, the content address may include an address for a router providing a gateway to a local network. For further example, the content request may be a conventional HTTP request via a TCP connection. In addition, the content request identifies content that is requested to be transmitted to the destination address for the requesting node. The content request may be devoid of information concerning eligibility of the client to receive the requested content.

At 404, the content provider server may determine whether or not the requested content is restricted content. For example, the content may be age-restricted content that is not to be provided to persons under a designated age. For further example, the content may be region-restricted content that is forbidden for persons residing in (or not residing in) a particular geographic region. In general, the content restrictions may relate to information concerning one or more persons that use the client to which the content is to be transmitted. The information should not comprise secret or private information, for example, passwords, decryption keys, or personal identification numbers, to protect the secret or private information from discovery via a reverse DNS lookup. If the requested content is not restricted, the content provider server may cause the requested content to be transmitted to the designated address 406. For example, the content provider may retrieve the content and transmit it directly to the designated address, or instruct another server, such as a file server, to transmit the content.

If the content is restricted content, the content provider server may generate a reverse DNS query using the destination address as input 408. The rDNS query may be configured to retrieve the resource record associated with the destination address in the DNS zone file, or equivalent DHCP file or other file used in dynamic IP addressing. The rDNS query may be generated and transmitted via the computer network using any suitable protocol, examples of which are described hereinabove. At 410, the provider may assess any response received to the rDNS query, to determine whether or not the record returned, if any, by the rDNS query includes necessary user parameter information, and whether or not the user parameter information, if present, indicates that the destination address is eligible to receive the restricted content. Such assessment may include parsing the resource record to detect and interpret user parameters encoded in a text record using a predetermined coding scheme. Any suitable algorithm for data processing may be used by the content provider server to process the resource record, identify the user parameter data, and to interpret the user parameter data with a predetermined control scheme. The user parameter data may be decoded from any machine-readable data, including but limited to ASCII, hexadecimal, and binary coding.

For example, the rDNS query may return a resource record that contains no user parameter information. In such case, the content provider server may cause the requested content to be transmitted to the designated address 406. In the alternative, the content provider server may restrict transmission of the requested content to the designated address 412, and optionally may transmit a message to the designated address indicating that the content will not be transmitted 414. The message may include an invitation to authenticate eligibility via a different method, such as by providing credit card information or other eligibility verification based on personal private data supplied by the end user. In the case where no user parameter is provider, the choice of which option (406 or 412/414) may be predetermined according to the preference of the system administrator.

For further example, the rDNS query may return a resource record that contains user parameter information indicating that the destination address is not eligible to receive the requested content, such as information indicating an underage or out-of-region person using the destination address. In such case, the content provider server may restrict transmission of the requested content to the designated address 412, and optionally may transmit a message to the designated address indicating that the content will not be transmitted 414, as previously described. Still further, the rDNS query may return a resource record that contains user parameter information indicating that the destination address is eligible to receive the requested content, or is not ineligible to receive the requested content. For example, the resource record may contain a parameter indicating that no person using the destination address is under a designated age, or otherwise ineligible to receive the requested content. If the resource record positively indicates that the destination address is eligible, or indicates that it is not ineligible, the content provider server may cause the requested content to be transmitted to the designated address 406.

Numerous modifications and variations of the disclosure are possible in light of the above disclosure. The claimed subject matter is defined by the appended claims.

The invention claimed is:

1. A computer-implemented method for alerting an Internet content provider to at least one user parameter associated with a content request, the method comprising:
receiving a reverse DNS lookup query from the Internet content provider via a computer network, the reverse DNS lookup query specifying a host IP address;
obtaining a host domain name and the at least one user parameter stored in a DNS zone file for the host IP address, wherein the at least one user parameter describes a demographic attribute of a person associated with the host domain name;
providing the host domain name and the at least one user parameter in a signal to the Internet content provider, in response to the reverse DNS lookup query; and
controlling distribution of content to the host IP address using the Internet content provider, based on the at least one user parameter received in response to the reverse DNS lookup query, wherein the at least one user parameter indicates a numerical age for one or more users of the host IP address, and the controlling distribution of content comprises determining whether to provide age-restricted content to the host IP address, based on the numerical age.

2. The method according to claim 1, further comprising obtaining the at least one user parameter from a resource record of the zone file.

3. The method according to claim 1, further comprising obtaining the at least one user parameter encoded as text in a resource record of the zone file.

4. The method according to claim 1, further comprising providing the at least one user parameter representing information further selected from a birth date and a geographic area where the person resides.

5. The method according to claim 2, further comprising receiving information indicating the at least one user parameter from an Internet service provider for a host associated with the resource record, and placing the at least one parameter into the resource record.

6. The method according to claim 5, further comprising modifying the at least one user parameter stored in the resource record using updated information supplied by the Internet service provider.

7. A non-transitory computer-readable medium encoded with instructions for:
receiving a reverse DNS lookup query from a remote host, the reverse DNS lookup query specifying a host IP address;
accessing a host domain name and at least one user parameter stored in a DNS zone file for the host IP address, wherein the at least one user parameter describes a demographic attribute of a person associated with the host domain name;
transmitting the host domain name and the at least one user parameter in a signal to the remote host, in response to the reverse DNS lookup query; and
controlling distribution of content to the host IP address using an Internet content provider, based on the at least one user parameter received in response to the reverse DNS lookup query, wherein the at least one user parameter indicates a numerical age for one or more users of the host IP address, and the controlling distribution of content comprises determining whether to provide age-restricted content to the host IP address, based on the numerical age.

8. The computer-readable medium according to claim 7, further comprising encoded instructions for obtaining the at least one user parameter from a resource record of the zone file.

9. The computer-readable medium according to claim 7, further comprising encoded instructions for obtaining the at least one user parameter encoded as text in a resource record of the zone file.

10. The computer-readable medium according to claim 7, further comprising encoded instructions for providing the at least one user parameter representing information further selected from a birth date and a geographic area where the person resides.

11. The computer-readable medium according to claim 8, further comprising encoded instructions for receiving information indicating the at least one user parameter from an Internet service provider for a host associated with the resource record, and placing the at least one parameter into the resource record.

12. The computer-readable medium according to claim 11, further comprising encoded instructions for modifying the at least one user parameter stored in the resource record using updated information supplied by the Internet service provider.

13. An apparatus for alerting an Internet content provider of personal attributes of a computer user, the apparatus comprising a processor coupled to a computer memory, the memory holding instructions for:
receiving a reverse DNS lookup query from a remote host, the reverse DNS lookup query specifying a host IP address;
accessing a host domain name and at least one user parameter stored in a DNS zone file for the host IP address, wherein the at least one user parameter describes a demographic attribute of a person associated with the host domain name;
transmitting the host domain name and the at least one user parameter in a signal to the remote host, in response to the reverse DNS lookup query; and
controlling distribution of content to the host IP address using the Internet content provider, based on the at least one user parameter received in response to the reverse DNS lookup query, wherein the at least one user parameter indicates a numerical age for one or more users of the host IP address, and the controlling distribution of content comprises determining whether to provide age-restricted content to the host IP address, based on the numerical age.

14. The apparatus according to claim 13, wherein the memory holds further instructions for obtaining the at least one user parameter from a resource record of the zone file.

15. The apparatus according to claim 13, wherein the memory holds further instructions for obtaining the at least one user parameter encoded as text in a resource record of the zone file.

16. The apparatus according to claim 13, wherein the memory holds further instructions for providing the at least one user parameter representing information further selected from a a birth date and a geographic area where the person resides.

17. The apparatus according to claim 13, wherein the memory holds further instructions for receiving information indicating the at least one user parameter from an Internet service provider for a host associated with the resource record, and placing the at least one parameter into the resource record.

18. The apparatus according to claim 17, wherein the memory holds further instructions for modifying the at least one user parameter stored in the resource record using updated information supplied by the Internet service provider.

* * * * *